Patented Mar. 17, 1936

2,034,427

UNITED STATES PATENT OFFICE 2,034,427

PREPARATION OF ALIPHATIC AMINES

Arthur W. Campbell, Stow, Ohio, assignor to The B. F. Goodrich Company, New York, N. Y., a corporation of New York No Drawing. Application April 12, 1932, Serial No. 604,867

8 Claims. (Cl. 260—28)

This invention relates to the art of chemical manufacture, and particularly to the preparation of aliphatic amines by the reaction of aliphatic halogen compounds with ammonia.

It has heretofore been proposed to react aliphatic halogen compounds such as the alkyl halides with anhydrous ammonia with the formation in general of alkylamines and ammonium halide. This is quite a general reaction, used in the preparation of primary, secondary, and tertiary aliphatic, substituted and unsubstituted, and even cyclic amines, the nature and yield of the products depending on the character and proportions of the raw materials and the conditions of the reaction.

For instance, ethyl chloride may be reacted with ammonia to form monoethylamine, diethylamine, and triethylamine. Ethylene dichloride will react with ammonia to give ethylene diamine, diethylene triamine, and piperazine, as well as amines of higher molecular weight. Symmetrical dichlor ethyl ether with ammonia forms diamino diethyl ether, morpholine, and bis morpholyl diethyl ether. Similarly methyl chloride, bromide, or iodide, the various ethyl, propyl, butyl, amyl, etc. halides, the alkylene dihalides, the chlorhydrins, halogenated ethers, etc. undergo the same type of reaction. In general the formation of primary amines rather than secondary and tertiary, or of secondary rather than tertiary, is favored by employing an excess of ammonia and operating at a comparatively low temperature. The reaction under such conditions, however, is rather slow and the yield consequently lower than might be desired.

I have discovered that the reaction between an aliphatic halide and anhydrous ammonia can be accelerated and the yield of aliphatic amine considerably increased by carrying out the reaction at a pressure greater than the vapor pressure of the mixture at the reaction temperature. This pressure is most conveniently applied by introducing an inert gas such as nitrogen, hydrogen, helium, etc., or in some cases even air. However, it may be increased by mechanical means, particularly if the reaction is carried out continuously by pumping into a reaction chamber and bleeding out the reacted mixture. The total pressure is preferably raised to several times the vapor pressure, say to an initial value of about 100 atmospheres. The reaction will then be found to proceed more rapidly, and the yield of amine to be markedly increased over that obtainable under the same conditions without the application of the high pressure.

As a specific example of one embodiment of the process of this invention, 400 parts by weight of symmetrical dichlor ethyl ether dissolved in 500 parts of benzene are introduced into a nickel lined autoclave, and 286 parts of liquid anhydrous ammonia are added. The total pressure is then increased to about 1500 pounds per square inch by the addition of nitrogen gas, whereupon the autoclave is closed and the contents warmed to about 50° C. the pressure rising to about 1750 pounds. After approximately 24 hours the autoclave is opened and the excess ammonia evaporated off and reliquefied by compression. The solvent and the unreacted dichlorether remain in the autoclave, together with the aliphatic amines and large quantities of ammonium chloride. The ammonium chloride crystals are filtered off and the constituents of the liquid are separated by fractional distillation. An amount of morpholine is obtained equivalent to 80% of the dichlorether used up in the reaction, or 30% of the total dichlorether used. If the reaction were carried out under the same conditions without added pressure, the total pressure would not exceed 250 pounds, which is due almost entirely to the ammonia, and the yield of morpholine would be only about 35%, a considerable proportion of bis morpholyl ether, of little value, being formed, and the yield based on the total dichlorether would be only 13%.

While I have herein disclosed a preferred manner of performing my invention, I do not thereby desire or intend to limit myself solely thereto, for as hitherto stated, the precise proportions of the materials utilized may be varied and other materials having equivalent chemical properties may be employed if desired without departing from the spirit and scope of the invention as defined in the appended claims.

I claim:

1. The process of preparing amines which comprises adding an excess of anhydrous ammonia to an aliphatic halide, adding an inert gas to increase the total pressure to a value considerably above the vapor pressure of the mixture at the reaction temperature, and reacting the mixture.

2. The process of preparing amines which comprises adding an excess of anhydrous ammonia to an aliphatic dichloride, adding an inert gas to increase the total pressure to a value considerably above the vapor pressure of the mixture at the reaction temperature, and reacting the mixture.

3. The process of preparing morpholine which comprises adding an excess of anhydrous ammonia to symmetrical dichlor diethyl ether, adding an inert gas to increase the total pressure of the mixture at the reaction temperature, and reacting the mixture.

4. The process of preparing morpholine which comprises adding an excess of anhydrous ammonia to symmetrical dichlor diethyl ether, adding an inert gas to increase the total pressure to about 100 atmospheres, reacting the mixture, and separating the morpholine.

5. The process of preparing aliphatic amines which comprises reacting an alkyl halide with anhydrous ammonia in the presence of an inert gas in quantity sufficient to raise the pressure to a value considerably above the vapor pressure of the mixture at the reaction temperature.

6. The process of preparing aliphatic amines which comprises adding anhydrous ammonia to an alkyl chloride, adding an inert gas to increase the total pressure to a value considerably above the vapor pressure of the mixture at the reaction temperature, and reacting the mixture.

7. The process of preparing amines which comprises adding an excess of anhydrous ammonia to a saturated, open-chain, aliphatic halide, adding an inert gas to increase the total pressure to a value considerably above the vapor pressure of the mixture at the reaction temperature, and reacting the mixture.

8. The process of preparing amines which comprises adding an excess of anhydrous ammonia to a saturated, open-chain, aliphatic dichloride, adding an inert gas to increase the total pressure to a value considerably above the vapor pressure of the mixture at the reaction temperature, and reacting the mixture.

ARTHUR W. CAMPBELL.